Jan. 13, 1925.  1,523,316
F. J. TRAINOR
YOKE ARM SPRING BRACKET
Filed May 29, 1924

INVENTOR,
Felix J. Trainor,
By Joseph A. Minturn
Attorney.

Patented Jan. 13, 1925.

1,523,316

UNITED STATES PATENT OFFICE.

FELIX J. TRAINOR, OF NEWCASTLE, INDIANA, ASSIGNOR TO TRAINOR NATIONAL SPRING COMPANY, OF NEWCASTLE, INDIANA, A CORPORATION OF INDIANA.

YOKE-ARM SPRING BRACKET.

Application filed May 29, 1924. Serial No. 716,554.

*To all whom it may concern:*

Be it known that I, FELIX J. TRAINOR, a citizen of the United States, residing at Newcastle, in the county of Henry and State of Indiana, have invented new and useful Improvements in a Yoke-Arm Spring Bracket, of which the following is a specification.

The purpose of my invention is to provide bracket means for permitting the use of the longest possible transverse vehicle spring between the yoke ends of the usual form of front axles such that the bracket may be simply and neatly formed at a low cost and may be applied to the axle by anyone not mechanically skilled and such that an undivided bushing may be used in the bracket eye receiving the spring shackle bolt without interfering in any manner with means for rigidly securing the bracket to the yoke arm of the axle.

I accomplish these and such other objects as may become apparent in the following description by the means as illustrated in the accompanying drawing, in which—

Figure 1:
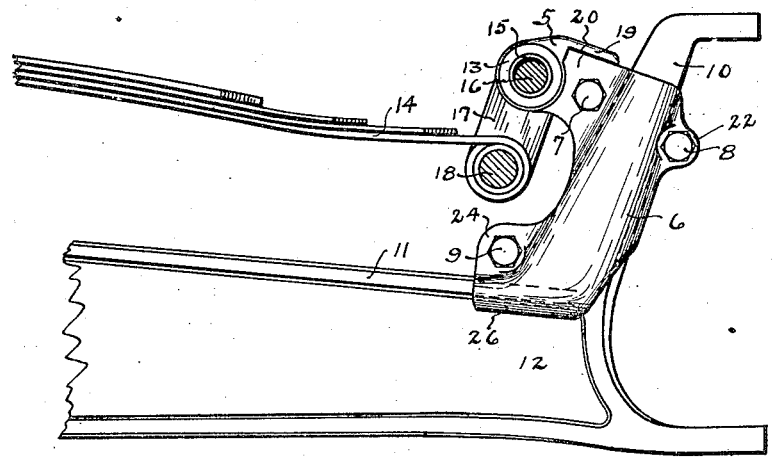
Figure 2:
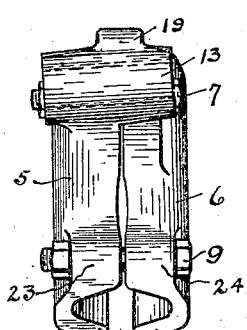
Figure 3:
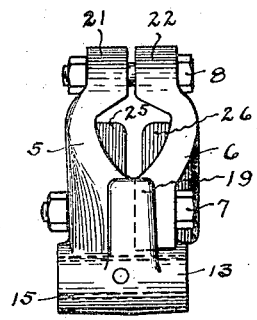

Fig. 1 is a vertical side elevation of my bracket secured in place on the upper right-hand yoke arm of an axle here reversed from its position when assembled with the vehicle and showing the manner in which the spring is attached to the bracket, the front shackle link being removed for the purpose of showing the parts more clearly; Fig. 2, a vertical side elevation of the bracket only from the spring side; Fig. 3, a top plan view of the bracket; and Fig. 4, a top plan view of the bracket, showing a modified construction, permitting the use of a full length bushing with a divided head.

Like characters of reference indicate like parts throughout the several views.

The bracket is formed of a back section 5 and a front section 6 such that when clamped together by the bolts 7, 8, and 9, an interior chamber is produced conforming to the exact size and shape of that portion of the upper yoke arm 10 and the flanges 11 of the axle 12 about which the bracket is to be secured. It is to be noted, that the sections 5 and 6 are so shaped as to completely envelop the yoke arm 10 throughout the length of the bracket from the under sides of the axle bed flanges 11, and that the plane of division of the two sections includes the axes of the axle bed 12 and the yoke arm 10.

The rear section 5 has an upper, inward extension terminating in the transversely drilled head 13, the length of which is made equal to the width of the spring 14, and a bushing 15 is pressed into the hole in the head to receive the upper spring shackle bolt 16 here indicated only in cross section for the purpose of avoiding confusion in showing the related parts. The spring 14 is swung below the head 13 from the bolt 16 by the usual shackles 17, the front one of which is omitted for the sake of clearness. It will be noted in Figs. 2 and 3, that the head 13 is offset and the offset end dropped slightly, both views being those of right-hand brackets. This position of the head 13 on the extension of the section 5 is for the purpose of causing the axle 12 to be tilted backwardly and of permitting the spring bolt 16 to be parallel to the bolt 18 in the spring so as to allow free and easy spring action. On account of this positioning of the head 13, it is necessary to make right and left hand sections 5 and 6.

Rising upwardly and extending outwardly, centrally from the top of the head 13 and projecting forwardly by approximately half its width of the inner face of the upper inner extension of the section 5 is a lug 19. The front section 6 is formed with an upper inward extension 20 with its upper edge contacting the under side of the projection of the lug 19 and its inner end curved to fit snugly around the forward extension of the head 13, such conformation being had so that by drawing up the bolts 7, 8, and 9, thereby clamping the two sections 5 and 6 about the yoke arm 10, the extension 20 of the section 6 takes its proportionate share of the spring load.

The bolt 7 passes through the upper inner extensions of both sections 5 and 6. An outwardly extending ear 21 from the section 5 and a similar ear 22 from the section 6 provide means through which the bolt 8 is passed to draw up the outer sides of the two sections. Similarly, lower inwardly projecting ears 23 and 24 are provided through which the bolt 9 is passed to maintain the lower ends of the sections 5 and 6 with their flange engaging hooks 25 and 26 in close and rigid contact with the axle 12.

Figure 4:
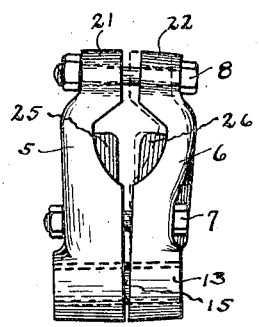

In the modified form of the bracket as indicated by the top plan view in Fig. 4, it will be noted that the back section 5 is cut clear through the head 13 on the plane of division of the central portion of the bracket and that the remainder of the head is an integral part of the front section 6, whereas in Figs. 1, 2, and 3, the head 13 is not split but entirely integral with the section 5. The bushing 15 equal in length to the width of the spring 14 is pressed into that portion of the head 13 on section 5 to bring one end flush with the outer or back face of the head. The bushing 15 then projects beyond the plane of division of the head 13 a length equal to the width of that portion of the head 13 carried by the section 6, which head portion is so drilled as to give a sliding fit over the projecting end of the bushing 15 acting as a pilot and as to cause the face on the plane of division of section 6 to be non-parallel to the corresponding face of the section 5 thereby causing the section 6 to assume an outward angle in relation to the section 5 as shown in solid lines. When the bolts 7, 8, and 9, are drawn up sufficiently to clamp the two sections 5 and 6 in the axle, the section 6 is drawn inwardly to the position as indicated by the dotted lines in Fig. 4. The relative positions from the solid to the dotted line position is somewhat exaggerated for the purpose of more clearly presenting the effect desired. As the section 6 is brought around to its parallel position with section 5, the bushing 15 is thereby firmly secured in the divided head 13.

The same offset and inclined head effect as in Figs. 1, 2, and 3 is obtained in the modified form of bracket as indicated in Fig. 4.

Having fully described my invention in the form now best known to me, what I claim as new and desire to secure by United States Letters Patent is:

1. In a vehicle, the combination with an axle having transverse end yoke members and a spring parallel with said axle of a bracket secured about the upper member of said axle yoke members and shackle means pivotally securing said spring to said bracket, said bracket substantially surrounding said upper yoke member, and having an upper inwardly extending member carrying a transverse head adapted to receive said shackle means, said head being offset and angularly positioned on said extension member to permit said axle to be tilted backwardly and allow parallel alignment of transverse bolts in said shackle means, said bracket having a lower inwardly projecting member adapted to rest on and extend transversely outwardly, downwardly, around, and under the upper flanges of said axle, under and adjacent to said yoke member, said bracket being provided with means permitting the parting of the bracket on the axial plane of said axle and said yoke member to form two sections and permitting the use of an undivided bushing in said head, and said bracket having bolt means of securing said two sections together in rigid contact with said axle members.

2. In a vehicle, the combination with an axle having transverse end yoke members and a spring parallel with said axle of a bracket secured about the upper member of said axle yoke members and shackle means pivotally securing said spring to said bracket, said bracket substantially surrounding said upper yoke member and being parted on the axial plane of said axle and said yoke members to form two sections, one of said sections having an upper inwardly extending member terminating in a shackle head, said head being offset and tilted transversely of said extending member and being drilled therethrough and having a bushing retained therein, the other of said two sections having a similar upper inwardly extending member terminating in an end adapted to contact a substantial surface of the head of said first section and adapted to contact by its upper side a projecting member from said first section, said bracket having a lower, inwardly extending member from each of said two sections adapted to rest on the top of, extend outwardly, downwardly and inwardly and engage from the under side the upper flanges of said axle under and adjacent to said upper yoke member, and a plurality of bolt means of rigidly securing the said two sections together about the said axle members.

3. In a vehicle, the combination with an axle having transverse end yoke members and a spring parallel with said axle of a bracket secured about the upper member of said yoke members and shackle means pivotally securing said spring to said bracket, said bracket substantially surrounding said upper yoke member and having an upper inwardly extending member terminating in a transversely offset and tilted shackle head, said bracket having its lower end projecting slightly inwardly and resting on and extending around and engaging under the flanges of said axle under and adjacent to said upper yoke member, said bracket being parted on the axial plane of said axle and said yoke member to form two sections, said bracket having a plurality of bolt means securing said two sections rigidly together about said axle members and having a bushing held by one end in the portion of the said shackle head on one of said sections with the projecting end of said bushing acting as a pilot to receive the remaining portion of the said head on the second of said sections, the portion of the head on the second of said sections being drilled on an angle in relation to the line of parting to receive said bushing such that by drawing up said bolt means securing said two sections together, said bushing is rigidly clamped in said bracket head.

Signed at Newcastle, Indiana, this the 16th day of May, 1924.

FELIX J. TRAINOR.